Feb. 27, 1934.   F. A. FAHRENWALD   1,949,100
GUNSIGHT RETICULE ADJUSTMENT MEANS
Filed Sept. 22, 1931
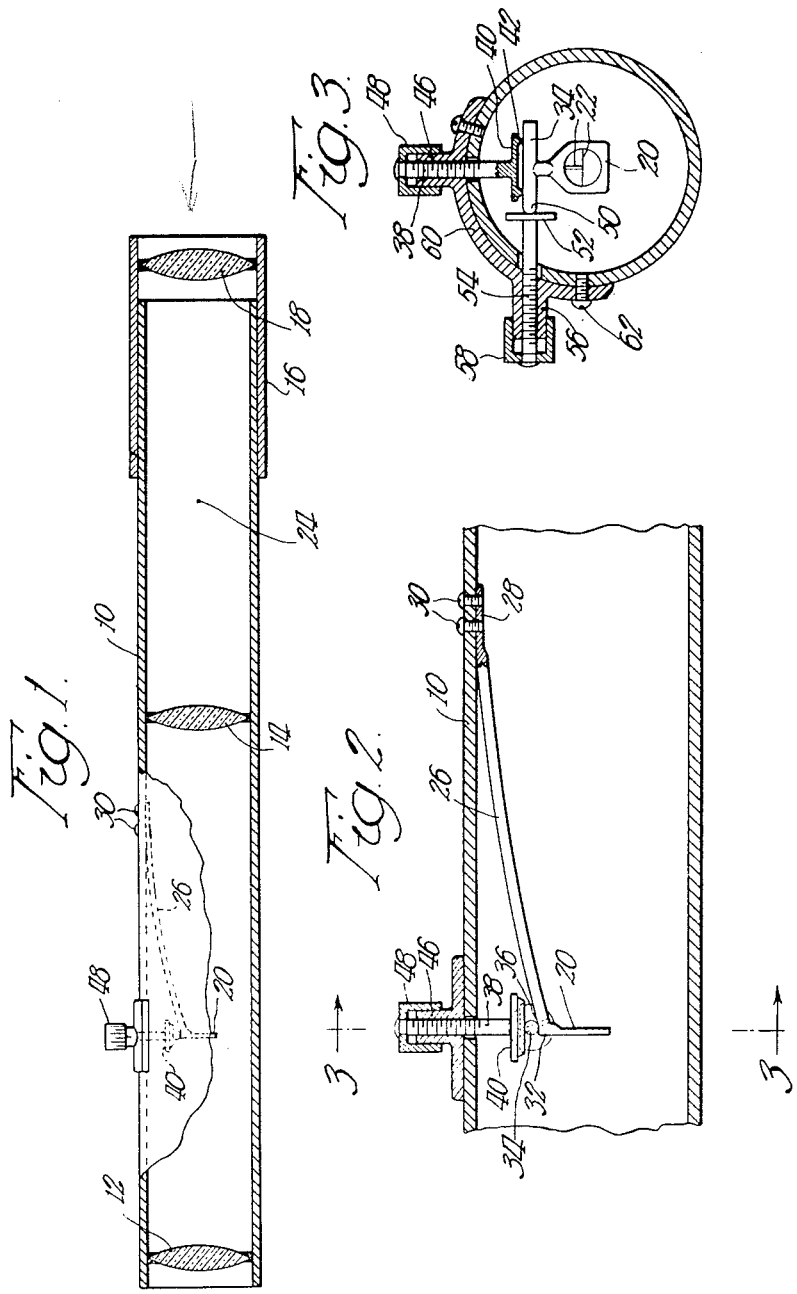
Inventor
Frank A. Fahrenwald
By Freeman and Sweet
Attys.

33. GEOMETRICAL INSTRUMENTS.

50

Patented Feb. 27, 1934

1,949,100

UNITED STATES PATENT OFFICE 1,949,100

GUNSIGHT RETICULE ADJUSTMENT MEANS

Frank A. Fahrenwald, Chicago, Ill.

Application September 22, 1931
Serial No. 564,325

9 Claims. (Cl. 33—50)

My invention relates to precise adjustment of a movable member, and includes among its objects and advantages the provision of adjustment means particularly suitable for adjusting such a movable member as the sighting member or reticule of a telescopic gunsight.

In the accompanying drawing:

Fig. 1 is a side elevation partly in section of an embodiment of the invention.

Fig. 2 is an enlarged central vertical section through the reticule and reticule support.

Fig. 3 is a transverse section on line 3—3 of Fig. 2.

In the embodiment selected to illustrate the invention, the telescope comprises the tube or body 10 supporting the objective 12 and the inverting lens assembly 14, and the eye piece 16 carrying the lens 18 adjustable axially for focusing. In such a telescope, the objective 12 projects the image of the target in the plane of the cross hairs of the reticule or other sighting member unit, comprising the frame 20 and the cross hairs 22. The inverted image of the target and the cross hairs of the reticule are then brought together into a re-inverted image at some such point as 24 by means of the lens 14, and this image is viewed by the user through the lens 18.

By providing the reticule unit with universal adjustment in the focal plane of the objective 12, it is possible to fasten or otherwise assemble the tube 10 as a rigid part of the rifle or other firearm without adjusting means other than for removal, and to make all the necessary final sighting-in adjustments by adjustment of the reticule inside the telescope tube.

Referring now to the support for the reticule, the resilient arm 26 is flattened at one end at 28 and fastened to the inner wall of the tube 10 by means of screws 30. It extends forwardly and downwardly at a slight angle to a turning point at 32, and then directly downwardly, being flattened out to form the reticule frame 20. A transverse pin 34 is fastened on the arm 26 at the point 32 by means of a rivet 36.

The adjustment screw 38 has an enlarged face 40 carrying a peripheral lip 42 engaging the cross pin 34 at two points spaced on opposite sides of the vertical central plane of the telescope. It is threaded through a boss 46 and carries a calibrated cap 48 for convenient adjustment. The left end of the pin 34 is rounded as at 50 in Fig. 3, and abuts the flat face 52 of the windage adjustment screw 54, which is threaded through the boss 56 and carries the cap 58. Except for their abutment faces, the adjustment screws 38 and 54 and their caps 48 and 58 are duplicates. The bosses 46 and 56 through which the adjustment screws are threaded are part of a die casting 60 fastened to the telescope tube by screws 62.

The arm 26, in undistorted and unadjusted position, tends to support the reticule in a position materially higher and to the left compared with the position of Fig. 3, and the reticule is brought to the adjusted position of Fig. 3 by advancing the adjustment screws. The path of movement of the cross hairs 22 during vertical adjustment is not vertical but upward and slightly forward toward the objective. This is desirable so that when the reticule is raised for firing on distant objects, which will be focused by the objective in a plane a trifle closer to the objective, the forward movement of the cross hairs of the reticule will increase the precision with which they are kept exactly at the focal plane of the objective.

In all positions of adjustment the arm 26 exerts a force upward and to the left as seen in Figure 3. In every position within the limits of adjustment, the point of contact between the rounded pin end 50 and the plate 52 is on one side of this line of force, and the point of contact between the remote portion of the lip 42 and the pin 34 is on the other side of the line of force, so that there is never any tendency to twist the arm 26 by torsion about its own longitudinal axis.

Without further elaboration, the foregoing will so fully explain my invention that others may, by applying knowledge current at the time of application, readily adapt the same for use under various conditions of service. For instance, with a prism type telescope the first image and the reticule will be between the prisms and the eye piece.

I claim:

1. In a sighting telescope for firearms having a tubular body, a sighting reticule, a flexible cantilever supporting element for said reticule, said supporting element being rigidly assembled to said telescope inside the body thereof and engaging the same axially remote from said reticule, and means for flexing said reticule supporting element to effect both windage and elevation adjustment of said sighting reticule.

2. In a sighting telescope for firearms, a sighting reticule, a single flexible cantilever supporting element for said reticule, said supporting element being rigidly assembled to said telescope and engaging the same axially remote from said reticule, and two means for flexing said reticule supporting element to effect both windage and elevation adjustment of said sighting reticule, said windage and elevation adjustment means each operating independently of the other and each permitting the other adjustment without disturbance of its own condition of adjustment 3. In a sighting telescope for firearms, a sighting reticule, a flexible cantilever supporting element for said reticule, said supporting element being rigidly assembled to said telescope and engaging the same axially remote from said reticule, and means for flexing said reticule supporting element to effect windage and elevation adjustment of said sighting reticule, said windage and elevation adjustment means each including a contact surface parallel to the line of action of the other adjustment.

4. In a precision optical instrument, a fixed support, a member to be supported spaced from said support, a flexible element fixedly attached at one end to said support and at the other end to said member, and two adjustment means abutting against said element to flex it in different directions, said element being under material strain in the normal condition of adjustment, both adjustment means pushing against said element on axes passing near the torsional axis of said element, one adjustment means having points of abutment on opposite sides of the torsional axis, and the other means having a single point of abutment, the contacting portions for each adjusting means including one surface extending substantially parallel to the line of action of the other adjusting means, and of sufficient extent to maintain contact throughout the range of adjustment of said other adjusting means.

5. In a telescope gun-sight having a body, a reticule, a laterally flexible supporting element of fixed length fastened to said reticule and to the body of said sight at points spaced axially of telescope, and first and second adjustment screws carried by said body for abutment with said element to flex it and adjust said reticule for windage and elevation, said element having an abutment surface for said first adjustment screw of convex shape and parallel to the line of action of said second adjustment screw, said first adjustment screw having an annular rib for two point contact with said abutment surface with one point on each side of the torsional axis of said element, said second adjustment screw having a flat abutment surface parallel to the line of action of said first adjustment screw and normal to its own axis and lying in a line passing through the torsional axis and parallel to the line of action of said second adjustment screw, one of the contact surfaces in each case extending beyond each point of contact in mean position of adjustment, far enough parallel to the other adjustment to maintain contact throughout the range of movement of the other adjustment.

6. In a sighting telescope for firearms, a hollow body member, a sighting reticule inside said body, a cantilever supporting element inside said body rigidly connected with said reticule and rigidly connected to said body at a point axially remote from said reticule, said cantilever supporting element being flexible substantially equally in any direction, and two adjustment means, each accessible from outside said body, and each extending inside said body and operatively engaging sand cantilever to flex it, one adjustment means flexing said cantilever in a vertical direction and the other in a horizontal direction.

7. In a sighting telescope for firearms, a hollow body member, a sighting reticule inside said body, a cantilever supporting element inside said body rigidly connected with said reticule and rigidly connected to said body at a point axially remote from said reticule, said cantilever supporting element being flexible substantially equally in any direction, and two adjustment means, each accessible from outside said body and each extending inside said body and operatively engaging said cantilever to flex it, one adjustment means flexing said cantilever in a vertical direction and the other in a horizontal direction, said cantilever comprising a single member substantially symmetrical about its own longitudinal axis.

8. In a sighting telescope for firearms, a hollow body member, a sighting reticule inside said body, a cantilever supporting element inside said body rigidly connected with said reticule and rigidly connected to said body at a point axially remote from said reticule, said cantilever supporting element being flexible substantially equally in any direction and upon any distortion exerting a force in a direction toward its undistorted position, and two adjustment means, each accessible from outside said body and each extending inside said body and operatively engaging said cantilever to flex it, one adjustment means flexing said cantilever in a vertical direction and the other in a horizontal direction, said adjustment means in all positions of adjustment engaging said cantilever on both sides of the line of force toward the undistorted position of the parts.

9. In a sighting telescope for firearms, a sighting reticule, a single flexible cantilever supporting element for said reticule, said supporting element being rigidly assembled to said telescope and engaging the same axially remote from said reticule, said supporting element when distorted exerting a force in a direction toward its undistorted position and two means for flexing said reticule-supporting element to effect both windage and elevation adjustment means each operating independently of the other and each permitting the other adjustment without disturbance of its own condition of adjustment, said adjustment means in all positions of adjustment engaging said cantilever on both sides of the line of force toward the undistorted position of the parts, to prevent any torsional distortion of said cantilever about its own longitudinal axis.

FRANK A. FAHRENWALD.